(12) United States Patent
Birau et al.

(10) Patent No.: US 8,123,848 B2
(45) Date of Patent: Feb. 28, 2012

(54) FLUORESCENT INK COMPOSITIONS AND FLUORESCENT PARTICLES

(75) Inventors: Maria M. Birau, Mississauga (CA); C. Geoffrey Allen, Waterdown (CA); Carol A. Jennings, Etobicoke County (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 89 days.

(21) Appl. No.: 12/772,662

(22) Filed: May 3, 2010

(65) Prior Publication Data

US 2011/0265687 A1    Nov. 3, 2011

(51) Int. Cl.
*C09D 11/02*    (2006.01)
(52) U.S. Cl. .................. 106/31.61; 106/31.15; 106/31.64
(58) Field of Classification Search ................ 106/31.15, 106/31.64, 31.61
See application file for complete search history.

(56) References Cited

U.S. PATENT DOCUMENTS

| | | | |
|---|---|---|---|
| 4,251,824 A | 2/1981 | Hara et al. | |
| 4,410,899 A | 10/1983 | Haruta et al. | |
| 4,412,224 A | 10/1983 | Sugitani | |
| 4,532,530 A | 7/1985 | Hawkins | |
| 4,601,777 A | 7/1986 | Hawkins et al. | |
| 4,830,671 A | 5/1989 | Frihart et al. | |
| 4,889,560 A | 12/1989 | Jaeger et al. | |
| 4,889,761 A | 12/1989 | Titterington et al. | |
| 5,122,187 A | 6/1992 | Schwarz et al. | |
| 5,194,638 A | 3/1993 | Frihart et al. | |
| 5,372,852 A | 12/1994 | Titterington et al. | |
| 5,389,958 A | 2/1995 | Bui et al. | |
| 5,597,856 A | 1/1997 | Yu et al. | |
| 5,782,996 A | 7/1998 | Fan | |
| 6,174,937 B1 | 1/2001 | Banning et al. | |
| 6,309,453 B1 | 10/2001 | Banning et al. | |
| 6,365,312 B1 * | 4/2002 | Foucher et al. | .......... 430/108.21 |
| 6,380,423 B2 | 4/2002 | Banning et al. | |
| 6,464,766 B1 | 10/2002 | Banning et al. | |
| 6,620,228 B1 | 9/2003 | King et al. | |

(Continued)

FOREIGN PATENT DOCUMENTS

GB    2 238 792 A    6/1991

OTHER PUBLICATIONS

"Dimer Acids," Kirk-Othmer Encyclopedia of Chemical Technology, vol. 8, 4$^{th}$ Ed. (1992), pp. 223-237.

(Continued)

*Primary Examiner* — Jerry Lorengo
*Assistant Examiner* — Veronica F Faison
(74) *Attorney, Agent, or Firm* — Oliff & Berridge, PLC (57) ABSTRACT

A fluorescent solid ink, and a method for making such ink, including an ink vehicle and a fluorescent particle. The fluorescent particle includes a fluorescent pigment, such as a trans-dicarboxylic-indenofluorenone, and at least one stabilizing wax chemically attached to the fluorescent pigment. The stabilizing wax includes an amine group at its terminal end and the fluorescent pigment includes at least one carboxylic acid group, where the amine group reacts with the carboxylic acid group to form an amide bond.

17 Claims, 3 Drawing Sheets

U.S. PATENT DOCUMENTS

| | | | |
|---|---|---|---|
| 6,858,070 B1 * | 2/2005 | Wong et al. | 106/31.61 |
| 6,860,930 B2 | 3/2005 | Wu et al. | |
| 6,906,118 B2 | 6/2005 | Goodbrand et al. | |
| 7,186,762 B2 | 3/2007 | Wong et al. | |
| 7,407,539 B2 | 8/2008 | Wu et al. | |
| 2008/0087190 A1 * | 4/2008 | Iftime et al. | 106/31.15 |
| 2008/0098929 A1 * | 5/2008 | Turek et al. | 106/31.29 |
| 2008/0297556 A1 | 12/2008 | Turek et al. | |
| 2010/0071590 A1 * | 3/2010 | Kazmaier et al. | 106/31.61 |

OTHER PUBLICATIONS

U.S. Appl. No. 12/246,120, filed Oct. 6, 2008 in the name of Birau et al.

U.S. Appl. No. 12/467,692, filed May 18, 2009 in the name of Goredema et al.

New U.S. Patent Application filed May 3, 2010 in the name of Vanbesien et al.

* cited by examiner

FLUORESCENT INK COMPOSITIONS AND FLUORESCENT PARTICLES

TECHNICAL FIELD

The present disclosure is generally directed to ink compositions and, more specifically, ink compositions having fluorescent particles, which may be useful for document security.

RELATED APPLICATIONS

U.S. patent application Ser. No. 12/772,689, filed May 3, 2010, the disclosure of which is hereby incorporated by reference in its entirety, describes the preparation of fluorescent particles comprising a fluorescent pigment, and at least one stabilizing wax attached to the fluorescent pigment. These fluorescent particles may be used in toners for printing secure documents.

U.S. patent application Ser. No. 12/246,120, filed Oct. 6, 2008, the disclosure of which is hereby incorporated by reference in its entirety, describes the preparation of a thioxanthene nanopigment (fluorescent yellow) using an acid pasting procedure in the presence of a "molecular dispersant." In this case, the "molecular dispersant" stabilizes the pigment by hydrogen bonding and it is not covalently attached to the pigment.

U.S. patent application Ser. No. 12/467,692, filed May 18, 2009, the disclosure of which is hereby incorporated by reference in its entirety, describes the preparation of an amide type dispersant. This type of dispersant has been successfully used to disperse magenta pigment red 57:1.

BACKGROUND

Fluorescent inks and toners may be used as an authenticating feature in the document security industry. Secure documents, for example documents that are difficult to forge, may be created using inks or toners that include fluorescent agents either alone or in combination with ordinary inks and/or pigments. Features printed using fluorescent inks or toners are usually invisible under visible light, due to the colorless nature of the security inks or due to masking by other colorants in the document. Under ultraviolet illumination, however, the fluorescent features of the document are revealed in the form of a bright emission by the fluorescent dyes in the visible spectrum. For example, certain bank notes utilize visible features, such as holographic patches, microprinting and microtextures to conceal additional fluorescent threads and/or multi-colored emblems embedded in the bank note, which are only revealed under specific light frequencies. These features provide an increased level of security against counterfeiters by making the copying process of such a document more difficult.

The term "fluorescent dye" refers to a fluorescent material that is soluble like any other organic molecule in a vehicle and easily makes homogeneous printing compositions.

The term "fluorescent pigment" refers to a fluorescent material that is insoluble in a vehicle and generally requires substituted uniform dispersion in the vehicle to use it. In most cases, the only medium available that may dissolve fluorescent pigments is a strong acid, such as concentrated sulfuric acid.

Fluorescent dyes have typically been used for fluorescent inks for xerographic and electrographic printing of security features. However, a major drawback of fluorescent dyes is that they degrade thermally. For example, the fluorescence can be lost after about 12 days of continuous heating at 125° C. This drawback is detrimental with respect to solid ink printers because the printers need to be powered, requiring high temperature, for an extended time, which has an adverse effect on the fluorescent dye.

Generally, pigments are considered the better alternative because of their improved chemical, light fastness and thermal stability. They are also preferred by the industry because there is limited or no migration or bleeding of the colorant compound, which more easily occurs with dyes. Pigments may also be significantly less expensive than dyes, and so are attractive colorants for use in printing inks.

To overcome the problems associated with fluorescent dyes described above, the security printing industry uses hard, robust pigments containing the dye of interest. These daylight fluorescent pigments are made of a hard cross-linked polymer matrix incorporating fluorescent dyes, and are dispersed in the marking vehicle, typically liquid inks. In the hard pigment particle, the dye is isolated from interaction with other materials present in the ink and as a result, chemical degradation by the environment is prevented. In addition, mobility of the dye is severely restricted by the hard polymer matrix, which is required for any thermal degradation process.

However, these hard pigment particles also present drawbacks. For example, the size of commercially available daylight fluorescent pigments is about 3-5 microns and even higher. Currently, inks based on fluorescent pigments are being printed by rotogravure, flexographic, silk-screening and off-set systems. Given their large size, these pigments cannot be used in ink jet printing, such as ink jet printing using solid inks or UV curable inks, because the pigments would produce physical clogging of the ink jet nozzles. For example, when preparing solid ink compositions by adding a conventional pigment to a solid ink base, pigments having a size of about 1 micron is cannot be used because of their tendency to plug the nozzles of the ink jet printer, due to their large size.

SUMMARY

The present disclosure addresses these and other problems, by providing fluorescent solid ink compositions, and methods for producing such compositions, comprising fluorescent pigments stabilized by a wax. By chemically attaching stabilizing groups containing waxy aliphatic chains to a fluorescent pigment, fluorescent particles are provided that have less crystalline and more softer, resin-like characteristics.

In embodiments, a fluorescent solid ink comprises an ink vehicle that is solid at room temperature and a fluorescent particle, where the fluorescent particle comprises a fluorescent pigment and at least one stabilizing wax chemically attached to the fluorescent pigment.

In embodiments, a fluorescent solid ink comprises a fluorescent particle comprising a carboxylic-indenofluorenone, and at least one alkyl chain having an amine group at its terminal end, where the amine group reacts with a carboxylic acid group of the carboxylic-indenofluorenone to form an amide bond.

In embodiments, a method for making a fluorescent solid ink comprising mixing an ink vehicle and a fluorescent particle, the fluorescent particle comprising a fluorescent pigment and at least one stabilizing wax chemically attached to the fluorescent pigment, heating the mixture, and cooling the heated mixture to fowl a solid ink.

EMBODIMENTS

Embodiments of the present disclosure provide fluorescent solid ink compositions for secure printing applications comprising an ink vehicle and a fluorescent particle, and methods for producing such solid ink compositions.

Fluorescent Particle

In embodiments, the fluorescent solid ink comprises a fluorescent particle, which is a fluorescent pigment chemically attached to at least one stabilizing wax. Any fluorescent pigment known in the art that is capable of chemically attaching a stabilizing wax may be used in the present disclosure. In embodiments, the fluorescent pigment may have at least one carboxylic acid group on its aromatic rings such that it forms an amide bond with an amine group of the stabilizing wax. Illustrative examples of such fluorescent pigments include carboxylic-indenofluorenone, such as monocarboxylic-indenofluorenone and dicarboxylic-indenofluorenone. Other suitable fluorescent pigments include various derivatized analogs, such as rhodamines, perylenes including C.I. Pigment Orange 43 and C.I. Pigment Red 194, perinones, squaraines, and BONA pigments such as C.I. Pigment Red 57 and C.I. Pigment Red 48.

Stabilizing waxes refer to, for example, waxy aliphatic chains that are compatible with resins present in an ink vehicle, thereby dispersing and stabilizing the pigment in the ink vehicle. Illustrative examples of a stabilizing wax include natural, modified natural, synthetic waxes and compounded waxes. Natural waxes may be of vegetable, animal, or mineral origin. Modified waxes are natural waxes that have been treated chemically to change their nature and properties. Synthetic waxes are made by the reaction or polymerization of chemicals. Compounded waxes are mixtures of various waxes or of waxes with resins or other compounds added thereto. These waxes may be used as is, or they may be functionalized, such as to include an amine group, to enable subsequent chemical reaction with the fluorescent pigment. The functional group may be located anywhere in the chemical structure, although such functional groups are generally terminal functional groups.

Suitable waxes, as to form an ink composition, may also include paraffins, olefins such as polyethylene and polypropylene, microcrystalline waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers and mixtures thereof.

In embodiments, the stabilizing wax may comprise a carboxylic acid-terminated polyethylene wax, which include mixtures of carbon chains with the structure $CH_3$—$(CH_2)_n$—COOH, where there is a mixture of chain lengths, n, where the average chain length may be in the range of about 16 to about 50, and linear low molecular weight polyethylene, of similar average chain length. Suitable examples of such waxes include, but are not limited to, UNICID® 350, UNICID® 425, UNICID® 550 and UNICID® 700 with $M_n$, equal to approximately 390, 475, 565 and 720 g/mol, respectively. Other suitable waxes having a structure $CH_3$—$(CH_2)_n$—COOH, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid with n=31, tetratriacontanoic or geddic acid with n=32, pentatriacontanoic or ceroplastic acid with n=33. Guerbet acids, characterized as 2,2-dialkyl ethanoic acids, are also suitable compounds. Suitable Guerbet acids may include, for example, those containing 16 to 36 carbons, many of which are commercially available from Jarchem Industries Inc., Newark, N.J. PRIPOL® 1009 (C-36 dimer acid mixture including isomers of the formula as well as other branched isomers which may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, 4$^{th}$ Ed. (1992), pp. 223 to 237, the disclosure of which is totally incorporated herein by reference) can also be used.

In embodiments, the stabilizing wax may further comprise an amine group at its terminal end. For example, the stabilizing wax may be prepared by reacting the carboxylic acid-terminated polyethylene wax with a diamine or a triamine in a molar ratio of about 1 to 1, and at temperature of about 110° C. to about 220° C., such as 180° C. Illustrative examples of such diamines include aliphatic, cyclic, or aromatic diamines and polyamines. Examples of such diamines include ethylene diamine, propylene diamine, 3,3-diamino-N-methyl-dipropylamine, 1,8-diamino-p-menthane, 1,4 diaminobutane, 1,3-diaminopentane, 1,5-diaminopentane, 1,6-diaminohexane, 1,2-diaminocyclohexane, 1,7-diaminoheptane, 1,8-diaminooctane, 1,10-diaminodecane, 4,4'-diaminobenzanilide, 4,4'-diaminobenzophenone, 2,7-diaminofluorene, 2,4-diaminotoluene, 2,3-diaminotoluene, triethylenetetraamine, tetraethylenepentaamine, Ethyleneamine E-100 and tris(2-aminoethylamine).

In embodiments, the fluorescent particle may be prepared by chemically attaching the fluorescent pigment to a stabilizing wax in a high boiling solvent. The reaction can be run neat in the stabilizing wax or in high boiling solvents such as Toluene, Xylenes, 1-methyl-2-pyrrolidinone, and neat at temperatures of about 110° C. to about 220° C., such as 180° C. The reaction can proceed under an inert atmosphere such as Argon.

In embodiments, the fluorescent particle may be of a size from about 2.8 μm (2800 nm) to about 100 nm, such as about 200 nm, about 300 nm, or about 400 nm. Thus, the particle may be about 2.8 μm or less, such as 2 μm or less, about 1 μm or less, about 400 nm or less, about 300 nm or less, about 200 nm or less, or about 100 nm or less.

Examples of fluorescent particles described above include the compounds in the table below, where each of the acids can be reacted with each of the amines.

Figure 1:
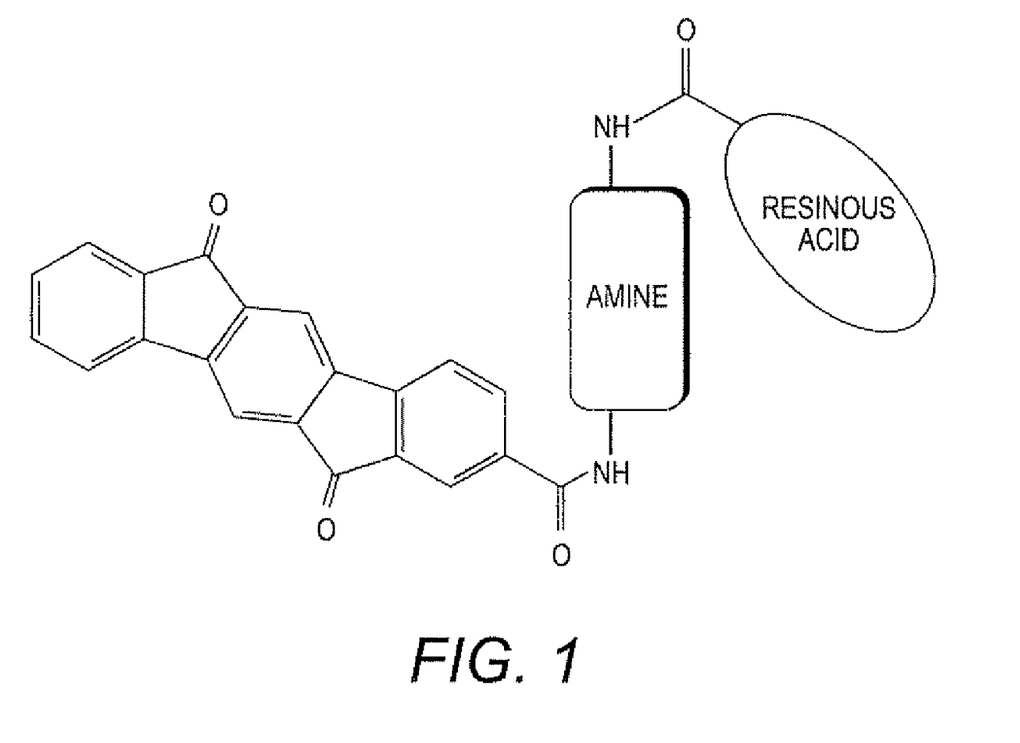
FIG. 1 depicts the generalized structure of a pigment particle comprising a monocarboxylic-indenofluorenone pigment attached to a waxy carboxylic acid and an amine.

| Indenofluorenone Pigment | Stabilizing Resin Components | | Generalized Structure |
|---|---|---|---|
| | Waxy Carboxylic Acid | Amine | |
| (structure shown) | UNICID ® 700, UNICID ® 350, UNICID ® 425, UNICID ® 550, hexadecanoic acid, heptadecanoic acid, octadecanoic acid, eicosanoic acid, docosanoic acid, tetracosanoic acid, hexacosanoic acid, heptacosanoic acid, octacosanoic acid, triacontanoic acid, dotriacontanoic acid, tritriacontanoic acid, tetratriacontanoic acid, pentatriacontanoic acid, Guerbet acids (16 to 36 carbons), PRIPOL ® 1009 (C-36 dimer acid mixture) | ethylene diamine, propylene diamine, 3,3-diamino-N-methyl-dipropylamine, 1,8-diamino-p-menthane, 1,4 diaminobutane, 1,3-diaminopentane, 1,5-diaminopentane, 1,6-diamonohexane, 1,2-diaminocyclohexane, 1,7-diaminoheptane, 1,8-diaminooctane, 1,10-diaminodecane, 4,4'-diaminobenzanilide, 4,4'-diaminobenzophenone, 2,7-diaminofluorene, 2,4-diaminotoulene, 2,3-diaminotoluene, triethylenetetraamine, tetraethylenepentaamine, ethyleneimine E-100, tris(2-aminoethylamine) | See FIG. 1 |

-continued

Figure 2:
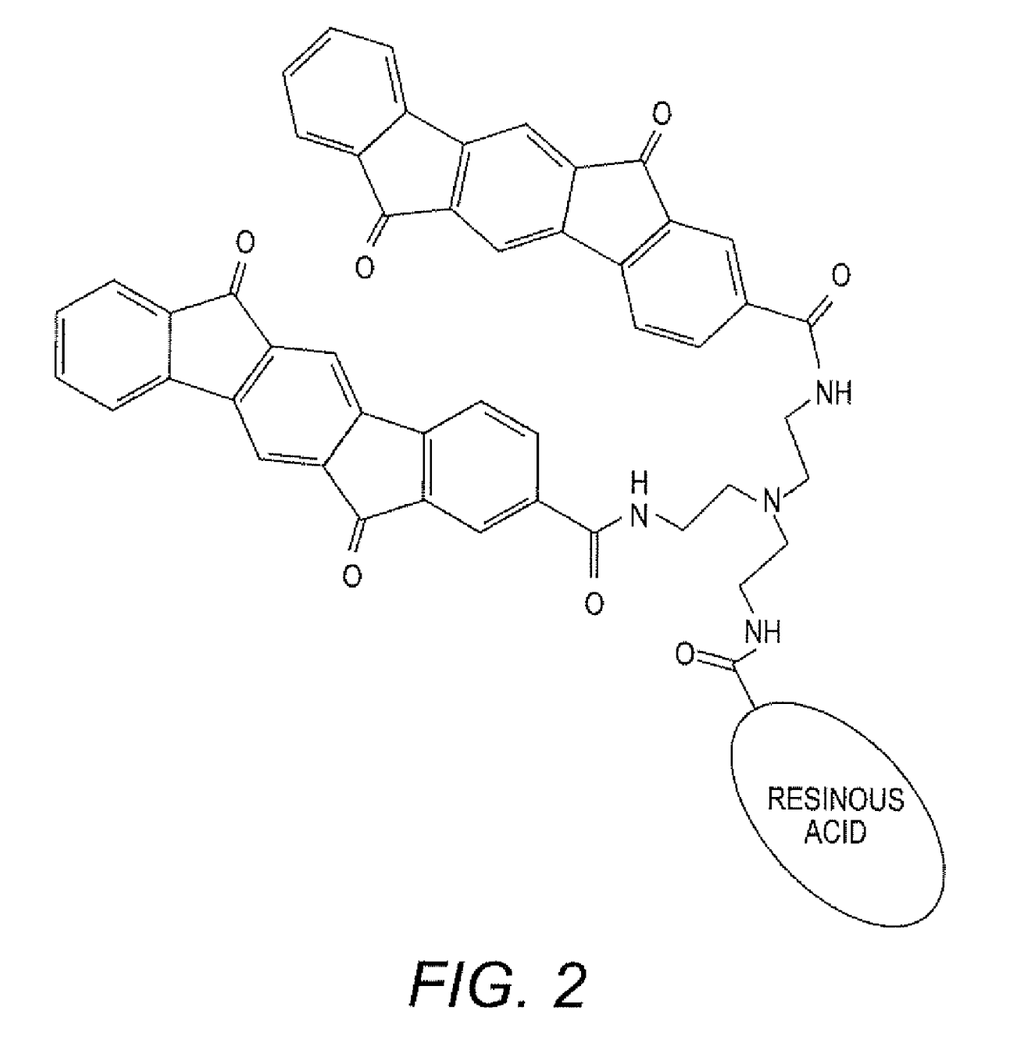
FIG. 2 depicts the generalized structure of a pigment particle comprising two monocarboxylic-indenofluorenone pigments attached to a waxy carboxylic acid and an amine.
Figure 3:
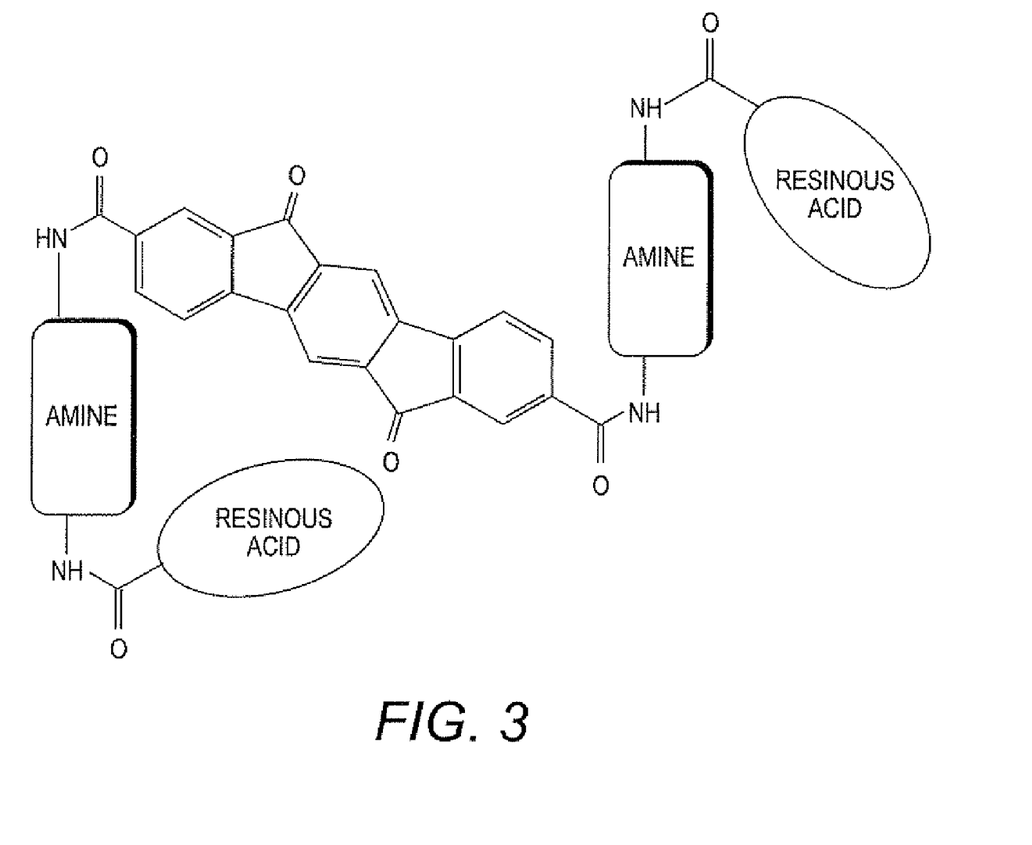
FIG. 3 depicts the generalized structure of a pigment particle comprising a dicarboxylic-indenofluorenone pigment attached to waxy carboxylic acids and amines.

| Indenofluorenone Pigment | Stabilizing Resin Components | | Generalized Structure |
|---|---|---|---|
| | Waxy Carboxylic Acid | Amine | |
| (structure: indenofluorenone dione with COOH) | UNICID ® 700, UNICID ® 350, UNICID ® 425, UNICID ® 550, hexadecanoic acid, heptadecanoic acid, octadecanoic acid, eicosanoic acid, docosanoic acid, tetracosanoic acid, hexacosanoic acid, heptacosanoic acid, octacosanoic acid, triacontanoic acid, dotriacontanoic acid, tritriacontanoic acid tetratriacontanoic acid, pentatriacontanoic acid, Guerbet acids (16 to 36 carbons), PRIPOL ® 1009 (C-36 dimer acid mixture) | ethylene diamine, propylene diamine, 3,3-diamino-N-methyl-dipropylamine, 1,8-diamino-p-menthane, 1,4 diaminobutane, 1,3-diaminopentane, 1,5-diaminopentane, 1,6-diamonohexane, 1,2-diaminocyclohexane, 1,7-diaminoheptane, 1,8-diaminooctane, 1,10-diaminodecane, 4,4'-diaminobenzanilide, 4,4'-diaminobenzophenone, 2,7-diaminofluorene, 2,4-diaminotoulene, 2,3-diaminotoluene, triethylenetetraamine, tetraethylenepentaamine, ethyleneimine E-100, tris(2-aminoethylamine) | See FIG. 2 |
| (structure: indenofluorenone dione with HOOC and COOH) | UNICID ® 700, UNICID ® 350, UNICID ® 425, UNICID ® 550, hexadecanoic acid, heptadecanoic acid, octadecanoic acid, eicosanoic acid, docosanoic acid, tetracosanoic acid, hexacosanoic acid, heptacosanoic acid, octacosanoic acid, triacontanoic acid, dotriacontanoic acid, tritriacontanoic acid tetratriacontanoic acid, pentatriacontanoic acid, Guerbet acids (16 to 36 carbons), PRIPOL ® 1009 (C-36 dimer acid mixture) | ethylene diamine, propylene diamine, 3,3-diamino-N-methyl-dipropylamine, 1,8-diamino-p-menthane, 1,4 diaminobutane, 1,3-diaminopentane, 1,5-diaminopentane, 1,6-diamonohexane, 1,2-diaminocyclohexane, 1,7-diaminoheptane, 1,8-diaminooctane, 1,10-diaminodecane, 4,4'-diaminobenzanilide, 4,4'-diaminobenzophenone, 2,7-diaminofluorene, 2,4-diaminotoulene, 2,3-diaminotoluene, triethylenetetraamine, tetraethylenepentaamine, ethyleneimine E-100, tris(2-aminoethylamine) | See FIG. 3 |

Ink Vehicles

In embodiments, the solid ink includes an ink vehicle (also known as a carrier material) or a mixture of two or more ink vehicles.

The ink vehicle or mixture is solid at temperatures of below 27° C., for example room temperature, and specifically is solid at temperatures below about 40° C. However, the ink vehicle changes phase upon heating, and is in a molten state at jetting temperatures.

In embodiments, the ink vehicle may have a melting point of from about 60° C. to about 150° C., for example from about 80° C. to about 120° C., from about 85° C. to about 110° C., from about 100° C. to about 110° C., or from about 105° C. to about 110° C. as determined by, for example, observation and measurement on a microscope hot stage where the binder material is heated on a glass slide and observed by microscope. Higher melting points are also acceptable, although print head life may be reduced at temperatures higher than 150° C.

In embodiments, the ink vehicle may have a viscosity of from about 1 to about 40 centipoise (cP), such as from about 5 to about 15 cP or from about 8 to about 12 cP, at an elevated temperature suitable for ink jet printing, such as temperatures of from about 50° C. to about 150° C., from about 70° C. to about 130° C., or from about 80° C. to about 130° C. The inks may jet at lower temperatures and, thus, require lower amounts of energy for jetting. In this regard, the inks herein may be low energy inks. Low energy inks have a jetting viscosity of from about 9 to about 13 cP, such as from about 10 to about 11 cP, from about 10.25 to about 10.75 cP or from about 10.45 to about 10.85 cP, at jetting temperatures of about 107° C. to about 111° C.

Any suitable ink vehicle can be employed. Suitable vehicles may include ethylene/propylene copolymers, highly branched hydrocarbons, hydrocarbon-based waxes, paraffins, high molecular weight linear alcohols, microcrystalline waxes, polyethylene waxes, ester waxes, fatty acids and other waxy materials, fatty amide containing materials, sulfonamide materials, resinous materials made from different natural sources (e.g., tall oil rosins and rosin esters), and many synthetic resins, oligomers, polymers, and copolymers such as further discussed below, and mixtures thereof.

Examples of suitable specific ink vehicles include, for example, polyethylene, such as those available from Baker Petrolite having the following general formula:

wherein x is an integer of from about 1 to about 200, such as from about 5 to about 150 or from about 12 to about 105. These materials may have a melting point of from about 60° C. to about 150° C., such as from about 70° C. to about 140° C., or from about 80° C. to about 130° C.; and a molecular weight (Mn) of from about 100 to about 5,000, such as from about 200 to about 4,000, or from about 400 to about 3,000. Examples of wax ink vehicles include POLYWAX 400 (Mn about 400), distilled POLYWAX 400 having a viscosity of about 10% to about 100% higher than the viscosity of the undistilled POLYWAX 400 at about 110° C., POLYWAX 500 (Mn about 500), distilled POLYWAX 500 having a viscosity of about 10% to about 100% higher than the viscosity of the undistilled POLYWAX 500 at about 110° C., POLYWAX 655 (Mn about 655), distilled POLYWAX 655 having a viscosity of about 10% to about 50% lower than the viscosity of the undistilled POLYWAX 655 at about 110° C., and distilled POLYWAX 655 having a viscosity of about 10% to about 50% higher than the viscosity of the undistilled POLYWAX 655 at about 110° C., POLYWAX 850 (Mn about 850), POLYWAX 1000 (Mn about 1,000), and the like.

Further examples include ethylene/propylene copolymers, such as those available from Baker Petrolite having the following general formula:

wherein z represents an integer from 0 to about 30, such as from 0 to about 20 or from 0 to about 10, y represents an integer from 0 to about 30, such as from 0 to about 20 or from 0 to about 10; and x is equal to about 21-y. The distribution of the side branches may be random along the carbon chain. The copolymers may have, for example, a melting point of from about 70° C. to about 150° C., such as from about 80° C. to about 130° C. or from about 90° C. to about 120° C.; and a molecular weight range of from about 500 to about 4,000. Commercial examples of such copolymers include, for example, Petrolite CP-7 (Mn=650), Petrolite CP-11 (Mn=1, 100), Petrolite CP-12 (Mn=1,200), and the like.

Additional examples include highly branched hydrocarbons, typically prepared by olefin polymerization, such as the VYBAR materials available from Baker Petrolite, including VYBAR 253 (Mn=520), VYBAR 5013 (Mn=420), and the like. Another type of ink vehicle may be n-paraffinic, branched paraffinic, and/or aromatic hydrocarbons, typically with from about 5 to about 100, such as from about 20 to about 80 or from about 30 to about 60 carbon atoms, generally prepared by the refinement of naturally occurring hydrocarbons, such as BE SQUARE 185 and BE SQUARE 195, with molecular weights (Mn) of from about 100 to about 5,000, such as from about 250 to about 1,000 or from about 500 to about 800, for example such as available from Baker Petrolite.

Another example includes modified maleic anhydride hydrocarbon adducts of polyolefins prepared by graft copolymerization, such as those available from Baker Petrolite and of the following general formulas:

wherein R is an alkyl group with from about 1 to about 50, such as from about 5 to about 35 or from about 6 to about 28 carbon atoms; R' is an ethyl group, a propyl group, an isopropyl group, a butyl group, an isobutyl group, or an alkyl group with from about 5 to about 500, such as from about 10 to about 300 or from about 20 to about 200 carbon atoms; x is an integer of from about 9 to about 13; and y is an integer of from about 1 to about 50, such as from about 5 to about 25 or from about 9 to about 13. The above materials have melting points of from about 50° C. to about 150° C., such as from about 60° C. to about 120° C. or from about 70° C. to about 100° C.

The above materials also include those materials available from Baker Petrolite and of the general formula wherein x is an integer of from about 1 to about 50, such as from about 5 to about 25 or from about 9 to about 13; y is 1 or 2; and z is an integer of from about 1 to about 50, such as from about 5 to about 25 or from about 9 to about 13.

The above materials also include those available from Baker Petrolite and of the general formula wherein $R_1$ and $R_3$ are hydrocarbon groups and $R_2$ is either of one of the general formulas or a mixture thereof, wherein R' is an isopropyl group. The materials may have melting points of from about 70° C. to about 150° C., such as from about 80° C. to about 130° C. or from about 90° C. to about 125° C., with examples of modified maleic anhydride copolymers including CERAMER 67 (Mn=655, Mw/Mn=1.1), CERAMER 1608 (Mn=700, Mw/Mn=1.7), and the like.

Further examples include high molecular weight linear alcohols, such as those available from Baker Petrolite and of the general formula wherein x is an integer of from about 1 to about 50, such as from about 5 to about 35 or from about 11 to about 23. These materials may have a melting point of from about 50° C. to about 150° C., such as from about 70° C. to about 120° C. or from about 75° C. to about 110° C.; and a molecular weight range of from about 100 to about 5,000, such as from about 200 to about 2,500 or from about 300 to about 1,500. Commercial examples include the UNILIN materials such as UNILIN 425 (Mn=460), UNILIN 550 (Mn=550), UNILIN 700 (Mn=700), and the like.

In addition, the ink vehicle may be an ethoxylated alcohol, such as available from Baker Petrolite and of the general formula wherein x is an integer of from about 1 to about 50, such as from about 5 to about 40 or from about 11 to about 24; and y is an integer of from about 1 to about 70, such as from about 1 to about 50 or from about 1 to about 40. The materials may have a melting point of from about 60° C. to about 150° C., such as from about 70° C. to about 120° C. or from about 80° C. to about 110° C. and a molecular weight range of from about 100 to about 5,000, such as from about 500 to about 3,000 or from about 500 to about 2,500. Commercial examples include UNITHOX 420 (Mn=560), UNITHOX 450 (Mn=900), UNITHOX 480 (Mn=2,250), UNITHOX 520 (Mn=700), UNITHOX 550 (Mn=1,100), UNITHOX 720 (Mn=875), UNITHOX 750 (Mn=1,400), and the like.

In addition, the ink vehicles described in U.S. Pat. No. 6,906,118, incorporated herein by reference in its entirety, may also be used. Also suitable as ink vehicles are liquid crystalline materials as disclosed in, for example, U.S. Pat. No. 5,122,187, the disclosure of which is incorporated herein by reference in its entirety.

Urethane, urea, amide and imide derivatives of oxidized synthetic or petroleum waxes, such as those available from Baker Petrolite having the following general formulas may also be used as the ink vehicle:

wherein R is an alkyl group of the formula $CH_3(CH_2)_n$; n is an integer of from about 5 to about 400, such as from about 10 to about 300 or from about 20 to about 200; and R' is a tolyl group. In embodiments, the urethane, urea, amide and imide derivatives may be linear, branched, cyclic, and any combination thereof. These materials may have a melting point of from about 60° C. to about 120° C., such as from about 70° C. to about 100° C. or from about 70° C. to about 90° C. Commercial examples of such materials include, for example, bis-urethanes such as PETROLITE CA-11, PETROLITE WB-5, and PETROLITE WB-17, all available from Baker Petrolite, and the like. Suitable examples also include urethane, urea, amide and imide derivatives disclosed in U.S. Pat. Nos. 6,620,228, 6,380,423, 6,464,766 and 6,309,453, each of which is incorporated herein by reference.

Additional resins and waxes may further be selected from the group consisting of a urethane resin obtained from the reaction of two equivalents of ABITOL E hydroabietyl alcohol and one equivalent of isophorone diisocyanate, prepared as described in U.S. Pat. No. 5,782,996, the disclosure of which is totally incorporated herein by reference; a urethane resin that was the adduct of three equivalents of stearyl isocyanate and a glycerol base alcohol, prepared as described in Example 4 of U.S. Pat. No. 6,309,453 the disclosure of which is totally incorporated herein by reference; and suitable amides including, for example, diamides, triamides, tetra-amides, cyclic amides, and the like. Fatty amides including monoamides, tetra-amides, and mixtures thereof, may also be included in the ink vehicle such as, for example, those described in U.S. Pat. Nos. 4,889,560, 4,889,761, 5,194,638, 4,830,671, 6,174,937, 5,372,852, 5,597,856, and 6,860,930 and British Patent No. GB 2 238 792, the entire disclosures of each are incorporated herein by reference; and those similar to what is described in U.S. Pat. No. 6,620,228, which is incorporated herein by reference in its entirety.

Fatty amides, such as monoamides, tetra-amides, mixtures thereof, and the like, such as those described in U.S. Pat. No. 6,858,070, incorporated herein by reference, may also be used. Suitable monoamides may have a melting point of at least about 50° C., for example from about 50° C. to about 150° C., although the melting point can be below this temperature. Specific examples of suitable monoamides include primary monoamides and secondary monoamides. Exemplary primary monoamides include stearamide, such as KEMAMIDE S available from Chemtura Corp. and CRODAMIDE S available from Croda; behenamide/arachidamide, such as KEMAMIDE B available from Chemtura and CRODAMIDE BR available from Croda; oleamide, such as KEMAMIDE U available from Chemtura and CRODAMIDE OR available from Croda, technical grade oleamide, such as KEMAMIDE O available from Chemtura, CRODAMIDE O available from Croda, and UNISLIP 1753 available from Uniqema; and erucamide such as KEMAMIDE E available from Chemtura and CRODAMIDE ER available from Croda. Exemplary secondary amides include behenyl behenamide, such as KEMAMIDE EX666 available from Chemtura; stearyl stearamide, such as KEMAMIDE S-180 and KEMAMIDE EX-672 available from Chemtura; stearyl erucamide, such as KEMAMIDE E-180 available from Chemtura and CRODAMIDE 212 available from Croda; erucyl erucamide, such as KEMAMIDE E-221 available from Chemtura; oleyl palmitamide, such as KEMAMIDE P-181 available from Chemtura and CRODAMIDE 203 available from Croda; and erucyl stearamide, such as KEMAMIDE S-221 available from Chemtura. Additional suitable amide materials include KEMAMIDE W40 (N,N'-ethylenebisstearamide), KEMAMIDE P181 (oleyl palmitamide), KEMAMIDE W45 (N,N'-ethylenebisstearamide), and KEMAMIDE W20 (N,N-ethylenebisoleamide).

Further resins suitable for use herein include triamides, such as those disclosed in U.S. Pat. No. 6,860,930 and U.S. Patent Application Publication No. 2008/0098929 (the entire disclosures of which are incorporated herein by reference). Triamides suitable for use include linear triamides, which are molecules where all three amide groups are drawn in the same molecular chain or branch. Examples of linear triamides include those triamides having the following formulas:

R can be any hydrocarbon having from about 1 to about 200 carbon atoms, such as from about 25 to 150 or from about 30 to about 100.

Linear triamides may further include those where a line can be drawn through the three amide groups, even if one would ordinarily draw a different line. One example of such a triamide can be expressed by the formula:

which can also be drawn as:

In embodiments, the triamide may also be a branched triamide. Examples of suitable branched triamides include those triamides disclosed in U.S. Pat. No. 6,860,930 and U.S. Patent Application Pub. No. 2008/0297556, each of which are incorporated herein in their entirety by reference. Any branched triamide disclosed in U.S. Pat. No. 6,860,930 and U.S. Patent Application Pub. No. 2008/0297556, is suitable for use herein.

Additional examples of suitable ink vehicles for the solid inks include rosin esters, such as glyceryl abietate (KE-100); polyamides; dimer acid amides; fatty acid amides, including ARAMID C; epoxy resins, such as EPOTUF 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX MH and KETJENFLEX MS80; benzoate esters, such as BENZOFLEX 5552, available from Velsicol Chemical Company; phthalate plasticizers; citrate plasticizers; maleate plasticizers; polyvinyl pyrrolidinone copolymers; polyvinyl pyrrolidone/polyvinyl acetate copolymers; novolac resins, such as DUREZ 12 686, available from Occidental Chemical Company; and natural product waxes, such as beeswax, montan wax, candelilla wax, GILSONITE (American Gilsonite Company), and the like; mixtures of linear primary alcohols with linear long-chain amides or fatty acid amides, such as those with from about 6 to about 24 carbon atoms, including PARICIN 9 (propylene glycol monohydroxystearate), PARICIN 13 (glycerol monohydroxystearate), PARICIN 15 (ethylene glycol monohydroxystearate), PARICIN 220 (N(2-hydroxyethyl)-12-hydroxystearamide), PARICIN 285 (N,N-ethylene-bis-12-hydroxystearamide), FLEXRICIN 185 (N,N'-ethylene-bis-ricinoleamide); and the like. Further, linear long-chain sulfones with from about 4 to about 16 carbon atoms, such as diphenyl sulfone, n-arnyl sulfone, n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, chlorophenyl methyl sulfone, and the like, are suitable ink vehicle materials.

The ink vehicle may comprise from about 25% to about 99.5% by weight of the ink, such as from about 30% to about 98%, from about 50% to about 85%, or from about 70% to about 80%.

Additives

The ink of embodiments may further include conventional additives to take advantage of the known functionality associated with such conventional additives. Such additives may include, for example, propellants, biocides, defoamers, slip and leveling agents, plasticizers, viscosity modifiers, antioxidants, UV absorbers, tackifiers, adhesives, conductivity enhancing agents, etc.

Plasticizers

The ink may include an optional plasticizer, such as UNIPLEX 250 (commercially 20 available from Uniplex); the phthalate ester plasticizers commercially available from Monsanto under the trade name SANTICIZER, such as dioctyl phthalate, diundecyl phthalate, alkylbenzyl phthalate (SANTICIZER 278); triphenyl phosphate (commercially available from Mon25 santo); KP-140, a tributoxyethyl phosphate (commercially available from FMC Corporation); MORFLEX® 150, a dicyclohexyl phthalate (commercially available from Morflex Chemical Company Inc.); trioctyl trimellitate (commercially available from Eastman Kodak Co.); pentaerythritol tetrabenzoate, commercially available as BENZOFLEX S552 (Velsicol Chemical Corporation); trimethyl titrate, commercially available as CITROFLEX 1 (Monflex Chemical Company); N,N-dimethyl oleamide, commercially available as HALCOMID M-18-OL (C. P. Hall Company); a benzyl phthalate, commercially available as SANTICIZER 278 (Ferro Corporation); and the like.

Plasticizers may either function as the ink vehicle or may act as an agent to provide compatibility between the ink propellant, which generally is polar, and the ink vehicle, which generally is non-polar. In embodiments, if the plasticizer functions as the ink vehicle, it may constitute from about 1% to 100% of the ink vehicle component of the ink. Alternatively, if the plasticizer functions as an additive in addition to another ink vehicle, the plasticizer may be present in an amount of at least about 0.05% by weight of the ink, such as at least about 1%, or at least about 2%, but typically no more than about 15%.

Viscosity Modifiers

The ink may further include an optional viscosity modifier. Examples of suitable viscosity modifiers include aliphatic ketones; stearone; 2-hydroxybenzyl alcohol; 4-hydroxybenzyl alcohol; 4-nitrobenzyl alcohol; 4-hydroxy-3-methoxy benzyl alcohol; 3-methoxy-4-nitrobenzyl alcohol; 2-amino-5-chlorobenzyl alcohol; 2-amino-5-methylbenzyl alcohol; 3-amino-2-methylbenzyl alcohol; 3-amino-4-methyl benzyl alcohol; 2(2-(aminomethyl)phenylthio)benzyl alcohol; 2,4,6-trimethylbenzyl alcohol; 2-amino-2-methyl-1,3-propanediol; 2-amino-1-phenyl-1,3-propanediol; 2,2-dimethyl-1-phenyl-1,3-propanediol; 2-bromo-2-nitro-1,3-propanediol; 3-tert-butylamino-1,2-propanediol; 1,1-diphenyl-1,2-propanediol; 1,4-dibromo-2,3-butanediol; 2,3-dibromo-1,4-butanediol; 2,3-dibromo-2-butene-1,4-diol; 1,1,2-triphenyl-1,2-ethanediol; 2-naphthalenemethanol; 2-methoxy-1-naphthalenemethanol; decafluoro benzhydrol; 2-methylbenzhydrol; 1-benzeneethanol; 4,4'-isopropylidene bis(2-(2,6-dibromo phenoxy)ethanol); phenylenedioxy)diethanol; 2,2-bis(hydroxymethyl)-2,2',2"-nitrilotriethanol; di(trimethylolpropane); 2-amino-3-phenyl-1-propanol; tricyclohexylmethanol; tris(hydroxymethyl)aminomethane succinate; 4,4'-trimethylene bis(1-piperidine ethanol); N-methyl glucamine; xylitol; or mixtures thereof. When present, the viscosity modifier is present in the ink in any effective amount, such as from about 10 to about 55% by weight of the ink, about 15 to 50% by weight of the ink, or from about 25 to about 40% by weight of the ink.

Antioxidants

The ink may optionally contain antioxidants to protect the images from oxidation and also may protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba-Geigy Corporation), (2) 2,2-bis(4-(2-(3,5-di-tert-butyl-4-hydroxyhydrocinnamoyloxy))ethoxyphenyl) propane (TOPANOL-205, available from ICI America Corporation), (3) tris(4-tert-butyl-3-hydroxy-2,6-dimethyl benzyl) isocyanurate (CYANOX 1790, 41,322-4, LTDP, Aldrich D12,840-6), (4) 2,2'-ethylidene bis(4,6-di-tert-butylphenyl) fluoro phosphorite (ETHANOX-398, available from Ethyl Corporation), (5) tetrakis(2,4-di-tert-butylphenyl)-4,4'-biphenyl diphosphonite (ALDRICH 46,852-5; hardness value 90), (6) pentaerythritol tetrastearate (TCI America #PO739), (7) tributylammonium hypophosphite (Aldrich 42,009-3), (8) 2,6-di-tert-butyl-4-methoxyphenol (Aldrich 25,106-2), (9) 2,4-di-tert-butyl-6-(4-methoxybenzyl)phenol (Aldrich 23,008-1), (10) 4-bromo-2,6-dimethylphenol (Aldrich 34,951-8), (11) 4-bromo-3,5-didimethylphenol (Aldrich B6,420-2), (12)

4-bromo-2-nitrophenol (Aldrich 30,987-7), (13) 4-(diethyl aminomethyl)-2,5-dimethylphenol (Aldrich 14,668-4), (14) 3-dimethylaminophenol (Aldrich D14,400-2), (15) 2-amino-4-tert-amylphenol (Aldrich 41,258-9), (16) 2,6-bis(hydroxymethyl)-p-cresol (Aldrich 22,752-8), (17) 2,2'-methylenediphenol (Aldrich B4,680-8), (18) 5-(diethylamino)-2-nitrosophenol (Aldrich 26,951-4), (19) 2,6-dichloro-4-fluorophenol (Aldrich 28,435-1), (20) 2,6-dibromo fluoro phenol (Aldrich 26,003-7), (21) α-trifluoro-o-creso-1 (Aldrich 21,979-7), (22) 2-bromo-4-fluorophenol (Aldrich 30,246-5), (23) 4-fluorophenol (Aldrich F1,320-7), (24) 4-chlorophenyl-2-chloro-1,1,2-tri-fluoroethyl sulfone (Aldrich 13,823-1), (25) 3,4-difluoro phenylacetic acid (Aldrich 29,043-2), (26) 3-fluorophenylacetic acid (Aldrich 24,804-5), (27) 3,5-difluoro phenylacetic acid (Aldrich 29,044-0), (28) 2-fluorophenylacetic acid (Aldrich 20,894-9), (29) 2,5-bis(trifluoromethyl)benzoic acid (Aldrich 32,527-9), (30) ethyl-2-(4-(4-(trifluoromethyl)phenoxy)phenoxy)propionate (Aldrich 25,074-0), (31) tetrakis(2,4-di-tert-butyl phenyl)-4,4'-biphenyl diphosphonite (Aldrich 46,852-5), (32) 4-tert-amyl phenol (Aldrich 15,384-2), (33) 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Uniroyal Chemical Company), and the like, as well as mixtures thereof. The antioxidant, when present, may be present in the ink in any desired or effective amount, such as from about 0.25% to about 10% by weight of the ink or from about 1% to about 5%.

UV Absorbers

The ink may also optionally contain a UV absorber. The optional UV absorbers primarily protect the generated images from UV degradation. Specific examples of suitable UV absorbers include (1) 2-bromo-2',4-dimethoxyacetophenone (Aldrich 19,948-6), (2) 2-bromo-2',5'-dimethoxyacetophenone (Aldrich 10,458-2), (3) 2-bromo-3'-nitroacetophenone (Aldrich 34,421-4), (4) 2-bromo-4'-nitroacetophenone (Aldrich 24,561-5), (5) 3',5'-diacetoxyacetophenone (Aldrich 11,738-2), (6) 2-phenylsulfonyl acetophenone (Aldrich 34,150-3), (7) 3'-aminoacetophenone (Aldrich 13,935-1), (8) 4'-aminoacetophenone (Aldrich A3,800-2), (9) 1H-benzotriazole-1-acetonitrile (Aldrich 46,752-9), (10) 2-(2H-benzotriazol-2-yl)-4,6-di-tert-pentylphenol (Aldrich 42,274-6), (11) 1,1-(1,2-ethane-diyl)bis(3,3,5,5-tetramethylpiperazinone) (commercially available from Goodrich Chemicals), (12) 2,2,4-trimethyl-1,2-hydroquinoline (commercially available from Mobay Chemical), (13) 2-(4-benzoyl-3-hydroxy phenoxy)ethylacrylate, (14) 2-dodecyl-N-(1,2,2,6,6-pentamethyl-4-piperidinyl)succinimide (commercially available from Aldrich Chemical Co., Milwaukee, Wis.), (15) 2,2,6,6-tetramethyl-4-piperidinyl/β-tetramethyl-3,9-(2,4,8,10-tetraoxo spiro(5,5)-undecane)diethyl-1,2,3,4-butane tetracarboxylate (commercially available from Fairmount), (16) N-(p-ethoxycarbonylphenyl)-N'-ethyl-N'-phenylformadine (commercially available from Givaudan), (17) 6-ethoxy-1,2-dihydro-2,2,4-trimethylquinoline (commercially available from Monsanto Chemicals), (18) 2,4,6-tris-(N-1,4-dimethylpentyl-4-phenylenediamino)-1,3,5-triazine (commercially available from Uniroyal), (19) 2-dodecyl-N-(2,2,6,6-tetramethyl-4-piperidinyl)succinimide (commercially available from Aldrich Chemical Co.), (20) N-(1-acetyl-2,2,6,6-tetramethyl-4-piperidinyl)-2-dodecyl succinimide (commercially available from Aldrich Chemical Co.), (21) (1,2,2,6,6-pentamethyl-4-piperidinyl/β-tetramethyl-3,9-(2,4,8,10-tetra oxo-spiro-(5,5)undecane)diethyl)-1,2,3,4-butane tetracarboxylate (commercially available from Fairmount), (22) (2,2,6,6-tetramethyl-4-piperidinyl)-1,2,3,4-butane tetracarboxylate (commercially available from Fairmount), (23) nickel dibutyl dithio carbamate (commercially available as UV-Chek AM-105 from Ferro), (24) 2-amino-2',5-dichlorobenzophenone (Aldrich 10,515-5), (25) 2'-amino-4',5-dimethoxyacetophenone (Aldrich 32,922-3), (26) 2-benzyl-2-(dimethylamino)-4'-morpholino butyrophenone (Aldrich 40,564-7), (27) 4'-benzyloxy-2'-hydroxy-3'-methylacetophenone (Aldrich 29,884-0), (28) 4,4'-bis(diethylamino) benzophenone (Aldrich 16,032-6), (29) 5-chloro-2-hydroxy benzophenone (Aldrich C4,470-2), (30) 4'-piperazinoacetophenone (Aldrich 13,646-8), (31) 4'-piperidinoacetophenone (Aldrich 11,972-5), (32) 2-amino-5-chlorobenzophenone (Aldrich A4,556-4), (33) 3,6-bis(2-methyl-2-morpholinopropionyl)-9-octylcarbazole (Aldrich 46,073-7), and the like, as well as mixtures thereof.

Tackifiers

The ink may also optionally include tackifiers, such as FORAL 85, a glycerol ester of hydrogenated abietic (rosin) acid (commercially available from Hercules), FORAL 105, a pentaerythritol ester of hydroabietic (rosin) acid (commercially available from Hercules), CELLOLYN 21, a hydroabietic (rosin) alcohol ester of phthalic acid (commercially available from Hercules), ARAXAWA KE-311 Resin, a triglyceride of hydrogenated abietic (rosin) acid (commercially available from Arakawa Chemical Industries, Ltd.), synthetic polyterpene resins such as NEVTAC 2300, NEVIAC 100, and NEVRAC 80 (commercially available from Neville Chemical Company), WINGTACK 86, a modified synthetic polyterpene resin (commercially available from Goodyear), and the like. The tackifier, when present, may be present in the ink in any desired or effective amount, such as at least about 0.1% by weight of the ink, at least about 5%, at least about 10%, or no more than about 50%.

Conductivity Enhancing Agents

An optional conductivity enhancing agent may also be included. Many ink vehicles of solid inks have an electrical conductivity of essentially zero. Thus, conductivity enhancing agents may be added to the ink vehicle to provide consistent conductivity to the ink. The conductivity is used as an input signal for a level sensor in the ink reservoir of the ink jet device.

In embodiments, the conductivity enhancing agent may be an organic salt formed from an organic base and an acid. The organic base of the organic salt of the conductivity enhancing agent may be an organic amine and have at least one long hydrocarbon chain. "Long hydrocarbon chain" refers to, for example, a linear or branched carbon alkyl or aryl chain having from about 10 carbons to about 50 carbons, such as from about 15 to about 40 carbons or from about 15 carbons to about 30 carbons. The long carbon chain of the organic salt allows it to be miscible in the ink vehicle.

Unless otherwise required, the optional additives, when present may each, or in combination, be present in the ink in any desired or effective amount, such as from about 0.1% to about 10% by weight of the ink or from about 3% to about 5%.

In embodiments, the solid ink may also optionally contain other materials, which may depend upon the type of printer in which the ink is used. For example, the ink vehicle composition is typically designed for use in either a direct printing mode or an indirect or offset printing transfer system.

Ink Preparation

The ink compositions can be prepared by any desired or suitable methods. For example, the components of the ink vehicle can be mixed together, followed by heating the mixture to at least its melting point (for example from about 60° C. to about 150° C., about 80° C. to about 120° C., or about 85° C. to about 110° C.). The fluorescent particle may be added before the ink ingredients have been heated or after the ink ingredients have been heated. The molten mixture may be subjected to simple stir-mixing, high shear mixing, or grinding; for example, in a high shear mixer, in an extruder, in a media mill, in a ball mill, in a homogenizer, or in combinations of the apparatus, to effect dispersion of the pigment in the ink carrier to obtain a substantially stable, homogeneous, and uniform melt. The resulting melt can be further mixed, and subjected to further mixing or grinding, with other ink ingredients to fine tune its properties for a particular printing system. The resulting ink is then filtered at 120° C. and cooled to ambient temperature (typically from about 20° C. to about 25° C.). The inks are solid at ambient temperature. In an embodiment, during the formation process, the molten inks are poured into molds and then cooled to form solid ink sticks. Suitable ink preparation techniques are disclosed in U.S. Pat. No. 7,186,762, the disclosure of which is incorporated herein by reference in its entirety.

Image Forming and Inkjet Devices

Solid ink jet processes are well known and are described, for example, in U.S. Pat. Nos. 4,601,777, 4,251,824, 4,410,899, 4,412,224 and 4,532,530, the disclosures of which are incorporated herein by reference in their entirety.

Printed images may be generated with the ink described herein by incorporating the ink into an inkjet device, for example a thermal inkjet device, an acoustic inkjet device, or a piezoelectric inkjet device, and concurrently causing droplets of the molten ink to be ejected in an imagewise manner onto a substrate. The ink is typically included in at least one reservoir connected by any suitable feeding device to the ejecting channels and orifices of the inkjet head for ejecting the ink. In the jetting procedure, the inkjet head may be heated, by any suitable method, to the jetting temperature of the inks. The reservoir(s) containing the solid ink may also include heating elements to heat the ink. The solid inks are thus transformed from the solid state to a molten state for jetting. "At least one" or "one or more" as used to describe other components of the inkjet device such as the inkjet head, reservoir, feeder, etc., refers to from 1 to about 15, such as from 1 to about 8 or from 1 to about 4 of any such component found in the inkjet device.

The inks can also be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate. An offset or indirect printing process is also disclosed in, for example, U.S. Pat. No. 5,389,958, the disclosure of which is incorporated herein by reference. Examples of apparatuses that are suitable for printing the solid inks described herein include apparatuses comprised of at least one ink retaining reservoir to store or hold solid ink, an ink jet head for printing the ink, and an ink supply line for providing the solid ink to the ink jet head.

The ink can be jetted or transferred onto any suitable substrate or recording sheet to form an image including plain papers such as XEROX® 4200 papers, XEROX® Image Series papers, Courtland 4024 DP paper, ruled notebook paper, bond paper, and the like; silica coated papers such as Sharp Company silica coated paper, JuJo paper, HAMMERMILL LASERPRINT® paper, and the like; glossy coated papers such as XEROX® Digital Color Gloss, Sappi Warren Papers LUSTROGLOSS®, and the like; transparency materials; fabrics; textile products; plastics; polymeric films; inorganic substrates such as metals, ceramics, and wood; and the like.

Example

All starting materials with the exception of UNICID 700 are purchased from Sigma Aldrich. UNICID 700 is obtained from Baker Petrolite.

Preparation of Trans-Dicarboxylic-Indenofluorenone

A trans-dicarboxylic-indenofluorenone is prepared in three steps starting with commercially available 2,5-dibromo-p-xylene. In the first step, as indicated in Scheme 1 below, a Suzuki type reaction between 2,5-dibromo-p-xylene and p-tolyl-boronic acid is used to prepare Product A. Specifically, in a 250 mL round bottom flask fitted with magnetic stirring, reflux condenser, argon inlet and oil heating bath are introduced 4.07 g (0.029 mol) p-tolyl boronic acid, 4.0 g (0.015 mol) 2,5-dibromo-p-xylene, 9.0 g (0.065 mol) potassium carbonate, 6.0 g (0.035 mol) tetramethyl ammonium bromide and 0.136 g (0.0014 mol) palladium acetate. The solids are flushed with argon for 15 minutes, followed by the addition of 40 mL of distilled water to the reaction mixture. The temperature is raised to 70° C. and the mixture is allowed to heat with stirring for about 4 hours. After 4 hours, the reaction is allowed to cool to room temperature, and another 50 mL of distilled water are introduced into the flask. The dark precipitate formed is isolated from the aqueous mother liquor through filtration using a filter paper. The solid is further dissolved in Toluene, a spatula of decolorizing charcoal is added to the solution and everything is heated to boil. The black residue is removed through filtration. The aqueous mother liquor is extracted twice with 40 mL dichloromethane and once with 40 mL Toluene. The organic layers are combined and dried over anhydrous magnesium sulfate. Finally, the solvent is removed in vacuum to afford 4.11 g (94%) of a white solid.

Product A is prepared according to Scheme 1.

Scheme 1.
Preparation of Product A using a Suzuki coupling method

Product A

In the second step, as indicated in Scheme 2 below, Product A is oxidized in the presence of potassium permanganate and pyridine to afford a tetracarboxylic acid derivative (Product B). Specifically, Product A (1.23 g, 0.0043 mol) is dissolved in 30 mL of pyridine and introduced into a 1 L round bottom flask fitted with magnetic stirring, reflux condenser and oil heating bath. Potassium permanganate (28 g, 0.177 mol) is introduced in portions of 2 to 3 g in 10 mL of distilled water over a period of 96 hours. During this time, the temperature in the reaction flask is maintained around 100° C. When the reaction is judged as complete, the resulted manganese dioxide is separated through filtration. The manganese dioxide is stirred in hot water (100 mL at 80° C.) and filtered. The two liquids are combined and acidified with Hydrochloric acid up to a pH of 2. After a white solid appears, the solid is filtered using a glass frit and dried in a vacuum oven at 130° C. for 2 hours. The product is obtained as a white solid (1.385 g, 79%). $H^1$ NMR in DMSO-$d_6$: δ (ppm): 7.5 (d, J=7.8 Hz, 2H), 7.7 (s, 1H), 7.9 (d, J=8.1 Hz, 2H).

Product B is prepared according to Scheme 2.

Scheme 2.
Preparation of a tetracarboxylic derivative (Product B) through oxidation In the third step, as indicated in Scheme 3 below, the trans-dicarboxylic-indenofluorenone is obtained through acid catalyzed cyclization in the presence oleum 7%. Specifically, in a 100 mL round bottom flask fitted with magnetic stirring, oil heating bath and reflux condenser are introduced Product B (1.2 g, 0.003 mol) and 7 mL of oleum 7%. The temperature is raised to 100° C. and the resulting brown solution is heated for 4 hours. The solution is allowed to cool to room temperature and poured in 100 mL distilled water. The resulting red precipitate is isolated through filtration using a glass frit and dried in a vacuum oven at 130° C. for 2 hours. The product is obtained as a purple solid (1.0 g, 92%).

The trans-dicarboxylic-indenofluorenone is prepared according to Scheme 3.

Scheme 3.
Preparation of trans-dicarboxylic-indenofluorenone through cyclization Preparation of a Stabilizing Wax

As indicated in Scheme 4 below, a stabilizing wax is prepared by reacting UNICID® 700 with ethylene diamine in a 1 to 1 ratio. Specifically, in a 1 L resin kettle fitted with heating mantle, mechanical stirring, Dean-Stark trap, reflux condenser and temperature sensor are introduced 144.59 g UNICID® 700 resin and 9.02 g 1,2-ethylenediamine (Aldrich). Under a stream of Argon, the temperature in the kettle is raised to 90° C. and the resin is allowed to melt. When the resin is completely melted, the temperature is gradually raised to 180° C. with stirring, and the reaction is allowed to proceed for 3 hours. Water (2.7 ml) is collected into the Dean-Stark trap. After 3 hours of reaction at 180° C., the kettle is emptied warm. The product is obtained as a beige resin (145 g, 96%).

The stabilizing wax is prepared according to Scheme 4.

Scheme 4. Preparation of a stabilizing wax

-continued

Preparation of Modified Amide Type Trans-Dicarboxylic-Indenofluorenone (Hereinafter "Red Resin")

As indicated in Scheme 5 below, the red resin is prepared by chemically attaching the fluorescent pigment with a stabilizing wax in a high boiling solvent. Specifically, in a 150 mL resin kettle fitted with heating mantle, magnetic stirring, Dean-Stark trap, reflux condenser and temperature sensor are introduced 1.0 g (0.0027 mol) trans-dicarboxylic-indenofluorenone, 6.036 g (0.0078 mol) stabilizing wax and 20 mL of Toluene. Under a stream of Argon, the temperature in the kettle is raised to 110° C. and the resin is allowed to melt. The reaction is allowed to proceed for 18 hours, after which the Toluene is flushed off and the temperature is raised to 140° C. The reaction is allowed to proceed for 3 hours, after which the kettle is emptied warm. The product is obtained as a red fluorescent resin (6.68 g).

The red resin is prepared according to Scheme 5.

Scheme 5. Preparation of red resin

Preparation of Solid Ink Concentrate Containing Red Resin

Heretofore "parts" refers to parts by weight. In a 600 mL beaker, add 136 parts KEMAMIDE S-180 (a stearyl stearamide) commercially available from Crompton Corporation. Allow the material to melt at 120° C. in an oven, then transfer to a Szevari 01 attritor, available from Union Process, that is heated to 120° C., and charged with 1800 g 440 C ⅛ inch diameter stainless steel balls available from Hoover Precision Products. Attach a heated impeller to the assembly and begin mixing such that the balls at the top of the vessel begin to tumble gently over each other. To this stirring mixture, add 16 parts of the red resin as depicted in Scheme 5. After 30 minutes of wetting at this speed, increase the speed such that the impeller's periphery velocity is about 150 centimeters per second. Continue the attrition for 18 hours.

Preparation of Solid Ink Containing Red Resin

The concentrate is isolated from the stainless steel balls via a sieve and where 12 parts are placed into a pre-heated vessel with pre-heated stirrer bar and allowed to stir for. To this is slowly added, having already been melted and thoroughly mixed at 120° C., 81.54 parts of a distilled polyethylene wax (a polyethylene wax having an average peak molecular weight of from about 350 to about 730 grams per mole, a polydispersity of from about 1.03 to about 3.0, and an asymmetrical molecular weight distribution skewed toward the high molecular weight end, as described in U.S. Pat. No. 7,407,539) from Baker Petrolite, 18.65 parts by weight triamide wax (triamide described in U.S. Pat. No. 6,860,930), 16.07 parts by weight S-180 (a stearyl stearamide) commercially available from Crompton Corp, 18.81 parts by weight KE-100 resin commercially available from Arakawa Corporation, triglycerides of hydrogenated abietic (rosin) acid, from Arakawa Chemical Industries, Ltd., 2.58 parts by weight of a urethane resin that is the adduct of three equivalents of stearyl isocyanate and a glycerol-based alcohol, prepared as described in Example 4 of U.S. Pat. No. 6,309,453, the disclosure of which is totally incorporated herein by reference, and 0.34 parts by weight Naugard-445 (an antioxidant) available from Crompton Corp. The ink containing red resin is stirred for 2 hours and is filtered past a 1 micron filter available from Parker-Hannefin Corporation at 120° C.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A fluorescent solid ink comprising:
   an ink vehicle; and
   a fluorescent particle, the fluorescent particle comprising a fluorescent pigment and at least one stabilizing wax chemically attached to the fluorescent pigment, wherein the fluorescent pigment is a carboxylic-indenofluorenone.

2. The fluorescent solid ink of claim 1, wherein the at least one stabilizing wax comprises an alkyl chain.

3. The fluorescent solid ink of claim 1, wherein the at least one chemically attached stabilizing wax comprises an amine group at its terminal end.

4. The fluorescent solid ink of claim 3, wherein the at least one stabilizing wax is chemically attached to the fluorescent pigment by the amine group of the stabilizing wax reacting with a carboxylic acid group of the fluorescent pigment to form an amide bond.

5. The fluorescent solid ink of claim 1, wherein the at least one chemically attached stabilizing wax is formed by reacting a carboxylic acid-terminated polyethylene wax with a diamine.

6. The fluorescent solid ink of claim 5, wherein the carboxylic acid-terminated polyethylene wax has the structure $CH_3-(CH_2)_n-COOH$, where n=10-60.

7. The fluorescent solid ink of claim 5, wherein the diamine is selected from the group consisting of ethylene diamine and propylene diamine.

8. The fluorescent solid ink of claim 1, wherein the fluorescent pigment is a derivatized analog of a compound selected from the group consisting of rhodamines, perylenes, perinones, squaraines, and β-oxynaphthoic acid pigments.

9. The fluorescent solid ink of claim 1, wherein the fluorescent pigment is a trans-dicarboxylic-indenofluorenone.

10. The fluorescent solid ink of claim 1, wherein the fluorescent solid ink is solid at a temperature below about 27° C. and molten at a temperature from about 60° C. to about 150° C.

11. The fluorescent solid ink of claim 1, wherein the fluorescent solid ink further comprises at least one additive selected from the group consisting of plasticizers, viscosity modifiers, antioxidants, UV absorbers, tackifiers, and conductivity enhancing agents.

12. A method for making a fluorescent solid ink, comprising:
   mixing an ink vehicle and a fluorescent particle, the fluorescent particle comprising a fluorescent pigment and at least one stabilizing wax chemically attached to the fluorescent pigment, wherein the fluorescent pigment is a carboxylic-indenofluorenone;
   heating the mixture; and
   cooling the heated mixture to form a solid ink.

13. The method of claim 12, wherein the at least one chemically attached stabilizing wax comprises an amine group at its terminal end.

14. The method of claim 13, wherein the at least one stabilizing wax is chemically attached to the fluorescent pigment by the amine group of the stabilizing wax reacting with a carboxylic acid group of the fluorescent pigment to form an amide bond.

15. The method of claim 12, wherein the at least one chemically attached stabilizing wax is formed by reacting a carboxylic acid-terminated polyethylene wax with a diamine.

16. The method of claim 15, wherein the diamine is selected from the group consisting of ethylene diamine and propylene diamine.

17. The method of claim 12, wherein the fluorescent pigment is a derivatized analog of a compound selected from the group consisting of rhodamines, perylenes, perinones, squaraines, and β-oxynaphthoic acid pigments.

* * * * *